US011955254B2

(12) United States Patent
Kusuma et al.

(10) Patent No.: US 11,955,254 B2
(45) Date of Patent: Apr. 9, 2024

(54) HYBRID HIGH FREQUENCY SEPARATOR WITH PARAMETRIC CONTROL RATIOS OF CONDUCTIVE COMPONENTS

(71) Applicant: Belden Inc., St. Louis, MO (US)

(72) Inventors: Roy Kusuma, Carmel, IN (US); Bill Clark, Richmond, IN (US); Alice Albrinck, Hebron, KY (US)

(73) Assignee: Belden, Inc., St. Louis, MO (US)

( * ) Notice: Subject to any disclaimer, the term of this patent is extended or adjusted under 35 U.S.C. 154(b) by 0 days.

(21) Appl. No.: 18/195,824

(22) Filed: May 10, 2023

(65) Prior Publication Data

US 2023/0282393 A1 Sep. 7, 2023

Related U.S. Application Data

(63) Continuation of application No. 17/478,753, filed on Sep. 17, 2021, now Pat. No. 11,682,501.

(60) Provisional application No. 63/081,689, filed on Sep. 22, 2020.

(51) Int. Cl.
*H01B 11/08* (2006.01)
*H01B 13/00* (2006.01)

(52) U.S. Cl.
CPC ......... *H01B 11/08* (2013.01); *H01B 13/0036* (2013.01)

(58) Field of Classification Search
CPC ............................ H01B 11/08; H01B 13/0036
USPC .......................................................... 174/350
See application file for complete search history.

(56) References Cited

U.S. PATENT DOCUMENTS

| | | | | |
|---|---|---|---|---|
| 4,453,031 | A * | 6/1984 | Justiss | H01B 11/085 174/105 B |
| 5,619,016 | A | 4/1997 | Newmoyer | |
| 5,767,441 | A | 6/1998 | Brorein et al. | |
| 6,153,826 | A | 11/2000 | Kenny et al. | |
| 6,323,427 | B1 | 11/2001 | Rutledge | |
| 7,109,424 | B2 | 9/2006 | Nordin et al. | |

(Continued)

FOREIGN PATENT DOCUMENTS

WO WO-2009/134360 A1 11/2009

OTHER PUBLICATIONS

Extended European Search Report dated Feb. 18, 2022, in European Application No. 21198130.3.

(Continued)

*Primary Examiner* — Timothy J Thompson
*Assistant Examiner* — Michael F McAllister
(74) *Attorney, Agent, or Firm* — Foley & Lardner LLP

(57) ABSTRACT

The present disclosure describes methods of manufacture and implementations of hybrid separators for data cables having conductive and non-conductive or metallic and non-metallic portions, and data cables including such hybrid separators. A hybrid separator comprising one or more conductive portions and one or more non-conductive portions may be positioned within a data cable between adjacent pairs of twisted insulated and shielded or unshielded conductors so as to provide physical and electrical separation of the conductors. The position and extent (laterally and longitudinally) of each conductive portion and each non-conductive portion may be selected for optimum performance of the data cable, including attenuation or rejection of cross talk, reduction of return loss, increase of stability, and control of impedance.

20 Claims, 13 Drawing Sheets

(56) References Cited

U.S. PATENT DOCUMENTS

| | | | | |
|---|---|---|---|---|
| 7,214,884 | B2 | 5/2007 | Kenny et al. | |
| 7,335,837 | B2 * | 2/2008 | Pfeiler | H01B 11/1008 174/113 C |
| 7,834,271 | B2 * | 11/2010 | Gromko | H01B 11/085 174/113 AS |
| 8,313,346 | B2 * | 11/2012 | Sparrowhawk | H01B 11/06 439/607.05 |
| 8,704,094 | B1 | 4/2014 | Gebs et al. | |
| 9,269,476 | B2 * | 2/2016 | Camp, II | H01B 11/04 |
| 9,363,935 | B1 * | 6/2016 | Cook | H05K 9/0098 |
| 9,824,794 | B1 * | 11/2017 | McNutt | H01B 7/04 |
| 9,928,943 | B1 * | 3/2018 | McNutt | H01B 11/1016 |
| 10,262,775 | B2 * | 4/2019 | Doneker | H01B 11/10 |
| 10,388,434 | B1 * | 8/2019 | Gebs | H01B 11/06 |
| 10,515,743 | B1 * | 12/2019 | Cook | H01B 11/04 |
| 10,867,724 | B1 * | 12/2020 | Lanoe | H01B 13/02 |
| 2003/0111241 | A1 * | 6/2003 | Bahlmann | H01B 11/06 174/352 |
| 2004/0026113 | A1 * | 2/2004 | Bahlmann | H01B 11/06 174/113 C |
| 2007/0102188 | A1 | 5/2007 | Glew | |
| 2009/0272571 | A1 * | 11/2009 | Gromko | H01B 11/085 174/378 |
| 2010/0200267 | A1 | 8/2010 | Baeck et al. | |
| 2011/0266052 | A1 | 11/2011 | Glew et al. | |
| 2014/0262425 | A1 | 9/2014 | Hopkinson et al. | |

OTHER PUBLICATIONS

First Office Action on CA Appl. No. 3131467, dated Nov. 23, 2022.

Non-Final Office Action on U.S. Appl. No. 17/478,753 dated Oct. 17, 2022.

Notice of Allowance on U.S. Appl. No. 17/478,753 dated Feb. 7, 2023.

Chinese Office Action on CN 202111106418.7 dated Apr. 29, 2023.

* cited by examiner

HYBRID HIGH FREQUENCY SEPARATOR WITH PARAMETRIC CONTROL RATIOS OF CONDUCTIVE COMPONENTS

RELATED APPLICATIONS

This application is a continuation application of U.S. patent application Ser. No. 17/478,753, filed Sep. 17, 2021, which claims the benefit of and priority to U.S. Provisional Patent Application No. 63/081,689, filed Sep. 22, 2020, the entirety of each of these patent applications is incorporated by reference herein.

FIELD

The present application relates to data cables. In particular, the present application relates to a hybrid high frequency separator with parametric control ratios of conductive components for data cables.

BACKGROUND

High-bandwidth data cable standards established by industry standards organizations including the Telecommunications Industry Association (TIA), International Organization for Standardization (ISO), and the American National Standards Institute (ANSI) such as ANSI/TIA-568.2-D, include performance requirements for cables commonly referred to as Category 6A type. These high performance Category 6A cables have strict specifications for maximum return loss and crosstalk, amongst other electrical performance parameters. Failure to meet these requirements means that the cable may not be usable for high data rate communications such as 1000BASE-T (Gigabit Ethernet), 10GBASE-T (10-Gigabit Ethernet), or other future emerging standards.

Crosstalk is the result of electromagnetic interference (EMI) between adjacent pairs of conductors in a cable, whereby signal flow in a first twisted pair of conductors in a multi-pair cable generates an electromagnetic field that is received by a second twisted pair of conductors in the cable and converted back to an electrical signal.

Return loss is a measurement of a difference between the power of a transmitted signal and the power of the signal reflections caused by variations in impedance of the conductor pairs. Any random or periodic change in impedance in a conductor pair, caused by factors such as the cable manufacturing process, cable termination at the far end, damage due to tight bends during installation, tight plastic cable ties squeezing pairs of conductors together, or spots of moisture within or around the cable, will cause part of a transmitted signal to be reflected back to the source.

Typical methods for addressing internal crosstalk have tradeoffs. For example, internal crosstalk may be affected by increasing physical separation of conductors within the cable or adding dielectric separators or fillers or fully shielding conductor pairs, all of which may increase the size of the cable, add expense and/or difficulty in installation or termination. For example, fully shielded cables, such as shielded foil twisted pair (S/FTP) designs include drain wires for grounding a conductive foil shield, but are significantly more expensive in total installed cost with the use of shielded connectors and other related hardware. Fully shielded cables are also more difficult to terminate and may induce ground loop currents and noise if improperly terminated.

SUMMARY

The present disclosure describes methods of manufacture and implementations of hybrid separators for data cables having conductive and non-conductive or metallic and non-metallic portions, and data cables including such hybrid separators. A hybrid separator comprising one or more conductive portions and one or more non-conductive portions may be positioned within a data cable between adjacent pairs of twisted insulated and shielded or unshielded conductors so as to provide physical and electrical separation of the conductors. The position and extent (laterally and longitudinally) of each conductive portion and each non-conductive portion may be selected for optimum performance of the data cable, including attenuation or rejection of cross talk, reduction of return loss, increase of stability, and control of impedance. The thicknesses and lateral shapes of the component may be adjusted to further enhance performance to a level previously not attainable with prior art.

In one aspect, the present disclosure is directed to a cable for reducing cross-talk between adjacent twisted pairs of conductors. The cable includes a first twisted pair of conductors having a first side portion and a first outwardly facing portion. The cable also includes a second twisted pair of conductors having a second side portion and a second outwardly facing portion. The cable also includes a hybrid separator comprising a first non-conductive portion and a first conductive portion attached to the first non-conductive portion. In some implementations, the first conductive portion has a smaller lateral dimension than a lateral dimension of the first non-conductive portion; and the first conductive portion is configured to provide a partial electrical shield the first side portion of the first twisted pair of conductors from the second side portion of the second twisted pair of conductors so as to reduce cross-talk between the first and second twisted pairs of conductors during operation of the cable, while minimizing impact to other electrical parameters such as impedance and attenuation compared to embodiments with full shield implementations (such as unshielded foiled twisted pair (U/FTP) or F/UTP cables).

BRIEF DESCRIPTION OF THE FIGURES

In the drawings, like reference numbers generally indicate identical, functionally similar, and/or structurally similar elements.

The patent or application file contains at least one drawing executed in color. Copies of this patent or patent application publication with color drawings will be provided by the Office upon request and payment of the necessary fee.

DETAILED DESCRIPTION

The present disclosure addresses problems of crosstalk between conductors of a multi-conductor cable, cable to cable or "alien" crosstalk (ANEXT), attenuation, internal crosstalk (NEXT), and signal Return Loss (RL) in a cost effective manner, without the larger, stiffer, more expensive, and harder to consistently manufacture design tradeoffs of typical cables. In particular, the methods of manufacture and cables disclosed herein reduce internal cable RL and NEXT and external cable ANEXT interference, meeting American National Standards Institute (ANSI)/Telecommunications Industry Association (TIA) 568.2-D Category 6A (Category 6 Augmented) specifications, while reducing cable thickness and stiffness.

Figure 1A:
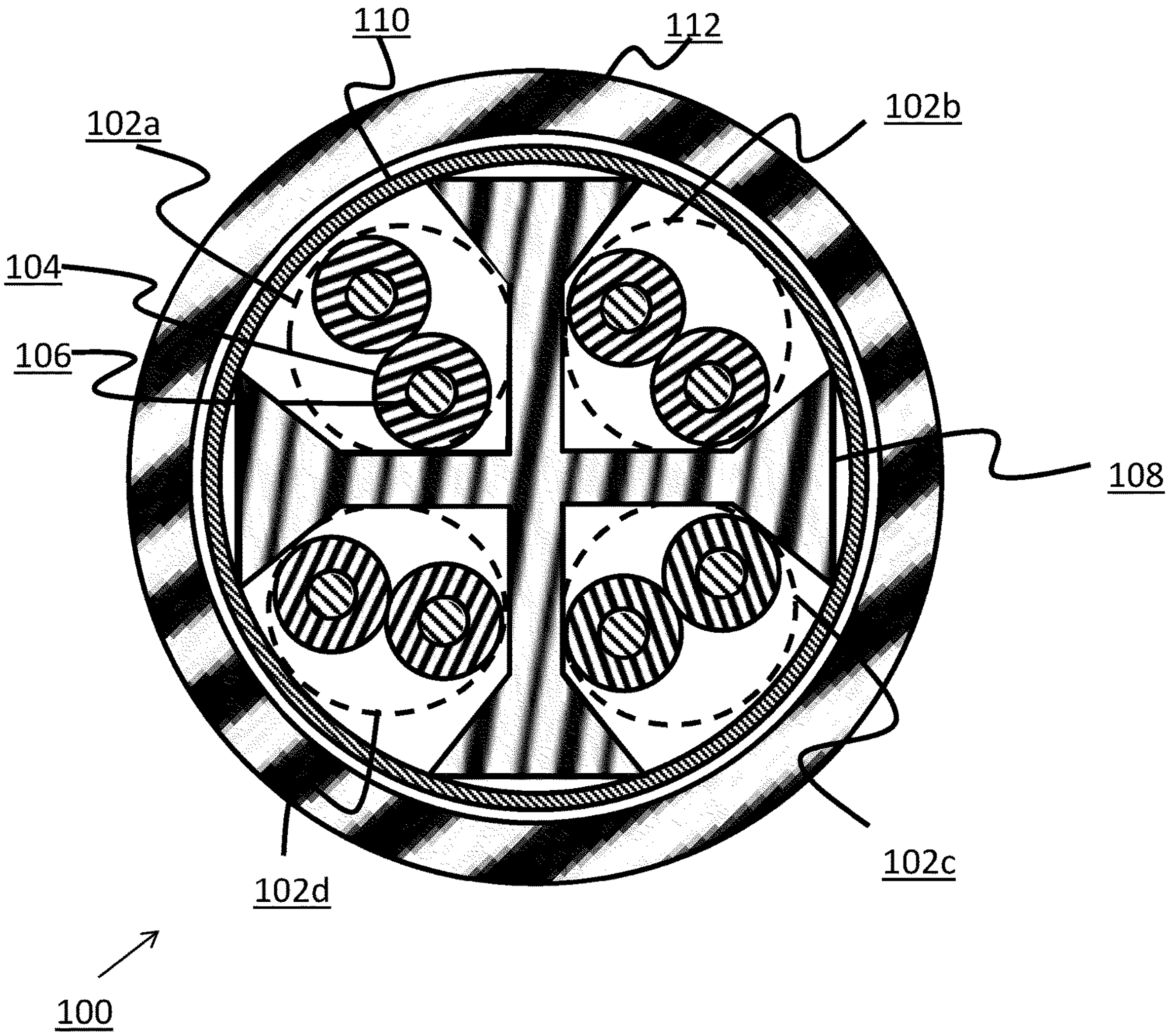
FIG. 1A is a cross section of an embodiment of a UTP cable incorporating a crossweb separator.

Many implementations of high bandwidth data cables utilize fillers or separators, sometimes referred to as "crosswebs" due to their cross like shape or by similar terms, that reduce internal crosstalk primarily through enforcing separation of the cable's conductors. For example, FIG. 1A is a cross section of an embodiment of an unshielded twisted pair (UTP) cable 100 incorporating a crossweb separator 108. The cable includes a plurality of unshielded twisted pairs 102*a*-102*d* (referred to generally as pairs 102) of individual conductors 106 encapsulated or surrounded by insulation 104. Conductors 106 may be of any conductive material, such as copper or oxygen-free copper (i.e. having a level of oxygen of 0.001% or less) or any other suitable material. Conductor insulation 104 may comprise any type or form of insulation, including fluorinated ethylene propylene (FEP) or polytetrafluoroethylene (PTFE) Teflon®, high density polyethylene (HDPE), low density polyethylene (LDPE), polypropylene (PP), or any other type of low dielectric loss insulation. The insulation around each conductor 106 may have a low dielectric constant (e.g. 1-3) relative to air, reducing capacitance between conductors. The insulation may also have a high dielectric strength, such as 400-4000 V/mil, allowing thinner walls to reduce inductance by reducing the distance between the conductors. In some embodiments, each pair 102 may have a different degree of twist or lay (i.e. the distance required for the two conductors to make one 360-degree revolution of a twist), reducing coupling between pairs. In other embodiments, two pairs may have a longer lay (such as two opposite pairs 102*a*, 102*c*), while two other pairs have a shorter lay (such as two opposite pairs 102*b*, 102*d*). Each pair 102 may be placed within a channel between two arms of a filler 108, said channel sometimes referred to as a groove, void, region, or other similar identifier.

Filler 108 may be of a non-conductive material such as flame retardant polyethylene (FRPE) or any other such low loss dielectric material. The filler 108 may have a cross-shaped cross section and be centrally located within the cable, with pairs of conductors in channels between each arm of the cross (e.g. pairs 102). At each end of the cross, in some embodiments, an enlarged terminal portion of the filler may provide structural support to the surrounding jacket 112. Although shown with anvil shaped terminal portions, in some implementations, crossweb fillers may have terminal portions that are rounded, square, T-shaped, or otherwise shaped.

In some embodiments, cable 100 may include a conductive barrier tape 110 surrounding filler 108 and pairs 102. Although shown for simplicity in FIG. 1 as a continuous ring, barrier tape 110 may comprise a flat tape material applied around filler 108 and pairs 102. The conductive barrier tape 110 may comprise a continuously conductive tape, a discontinuously conductive tape, a foil such as an aluminum foil, a dielectric material, a combination of a foil and dielectric material such as a foil sandwiched between two layers of a dielectric material such as such as polyester (PET), or any other such materials, and may include intermediate adhesive layers. In some embodiments, a conductive carbon nanotube layer may be used for improved electrical performance and flame resistance with reduced size. The cable 100 may also include a jacket 112 surrounding the barrier tape 110, filler 108, and/or pairs 102. Jacket 112 may comprise any type and form of jacketing material, such as polyvinyl chloride (PVC), fluorinated ethylene propylene (FEP) or polytetrafluoroethylene (PTFE) Teflon®, high density polyethylene (HDPE), low density polyethylene (LDPE), or any other type of jacket material. In some embodiments, jacket 112 may be designed to produce a plenum- or riser-rated cable.

As shown in FIG. 1A, the crossweb filler 108 comprises a substantial portion of the cable's cross section, in many implementations as much as 40 mils (0.04 inches) or more. While this may help increase the physical spacing between conductor pairs and thereby improve electrical characteristics, the substantial filler may add stiffness to the cable that may impede installation and longevity, and may limit how small the cable may be made. For example, many such implementations result in cables that have a cross-sectional diameter of 0.125 inches or larger. Additionally, the filler material may add expense to the cable's manufacturing, and in many implementations, is of a combustible material that may result in hazardous smoke in case of a fire.

Some attempts at addressing these and other problems of cables incorporating crossweb fillers have involved replacing the filler with a metallic tape or foil placed between the adjacent pairs of conductors in a cross shape, or sometimes in an S or other shapes. While such implementations may result in smaller and more flexible cables, metallic tapes may severely impact electrical performance. While they may reduce cross talk between pairs or noise coupling, this is done at the expense of attenuation (e.g. through self-induction), impedance, stability, return loss, and unbalanced frequency performance, causing the need to compensate, frequently by increasing insulation diameter or foaming the insulation.

Instead, the systems and methods discussed herein are directed to a hybrid semi-conductive filler or separator that has the advantages of thin foils or tapes without the impaired electrical characteristics. The thickness of the separator may be significantly smaller than in crossweb filler implementations (e.g. as small as 2-3 mils or 0.002 inches, or even smaller in some implementations), which may allow for reduction of the cross sectional size of the cable relative to cables using traditional separators. In particular, in some implementations, category 6A-compliant cables may be manufactured with a hybrid semi-conductive filler and have a resulting cross-sectional area and diameter similar to category 5e-compliant cables (e.g. unshielded twisted pair cables with no fillers). The incorporation of non-conductive or non-metallic components or portions of the separator allow for the fins to extend up to the enclosing barrier tape or jacket to ensure conductor separation, without requiring more metallic components than are necessary to achieve the desired noise and cross talk coupling performance characteristics, and thus limiting the separator's effects on impedance and attenuation. The non-metallic portions of the separator may also facilitate the use of standard processing fixtures and dies (e.g. similar to those utilized for manufacture of combination foil/dielectric barrier tapes), as well as maintain the orientation of the metallic components within the cable construction.

Figure 1B:
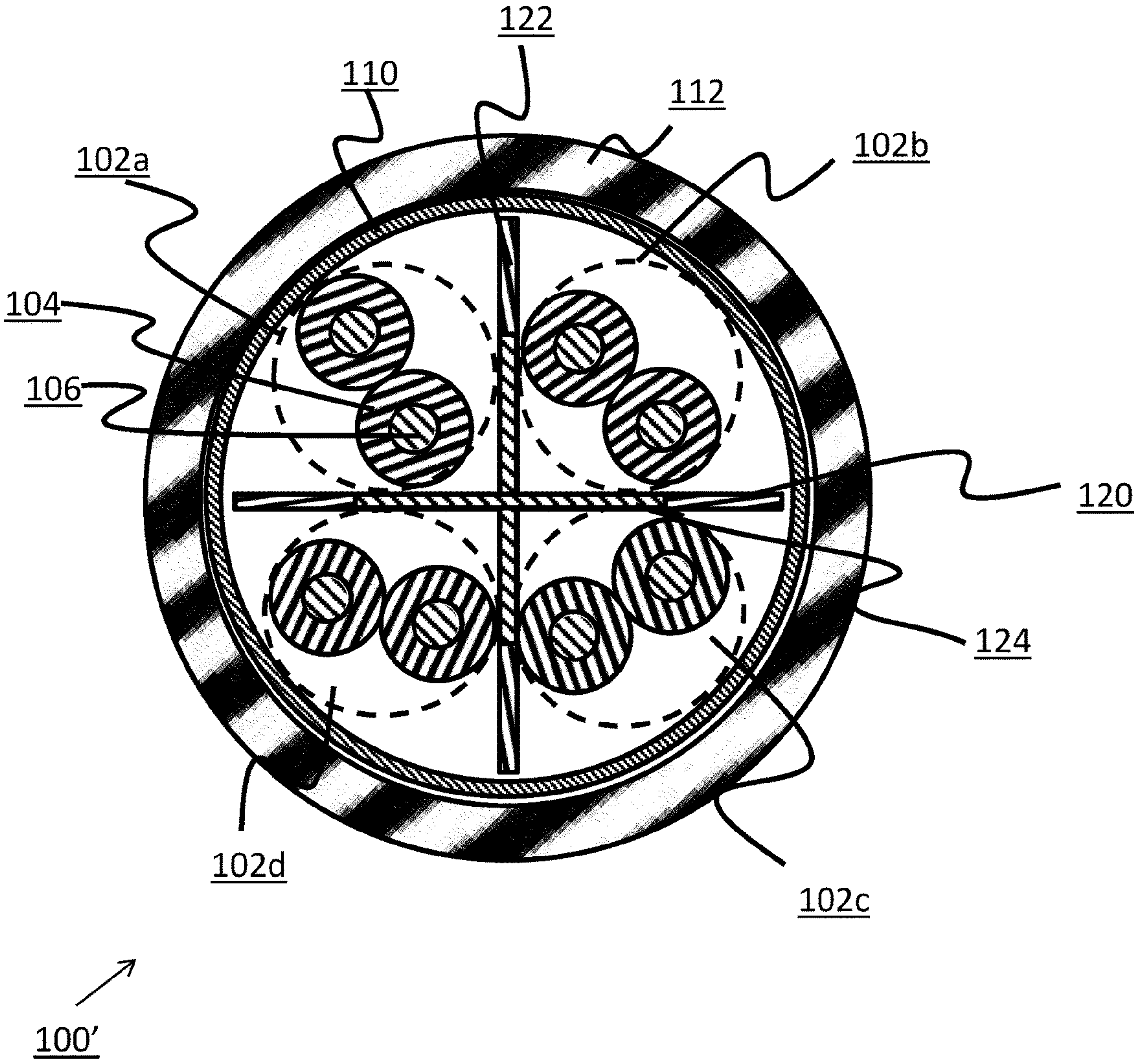
FIG. 1B is a cross section of an embodiment of a UTP cable incorporating a hybrid separator.

FIG. 1B is a cross section of an embodiment of a UTP cable 100' incorporating a semi-conductive hybrid separator 120. As with cable 100 of FIG. 1A, cable 100' includes a plurality of pairs 102*a*-102*d* of twisted individual conductors 106 encapsulated with insulation 104; a surrounding barrier tape or shield 110; and a surrounding jacket 112. However, instead of a filler 108, the semi-conductive hybrid separator 120 (referred to generally as separator 120) provides physical and electrical separation of conductor pairs 102. The separator 120 comprises a non-conductive portion 122 which may comprise any suitable dielectric material, such as mylar, polyethylene, polyester, etc., or any other non-conductive material that may be used as a substrate. The separator 120 also comprises a conductive portion 124, shown in the center of the separator 120 in FIG. 1B, which may provide crosstalk protection between conductor pairs. The conductive portion 124 may comprise any suitable conductive or semi-conductive material, such as an aluminum foil; adjustable conductivity materials, such as conductive or semi-conductive carbon nanotube structures or graphene; a conductive coating on a polyester substrate; or any other such material having shielding capability. Conductive portion 124 may be fixed to non-conductive portion 122 via an adhesive or similar means (not illustrated). As shown, in some implementations, the non-conductive portion 122 of the separator may extend in some implementations to the barrier tape 110 or jacket 112 (and may be referred to as the separator 'tips' or 'legs' in some implementations). By extending to the barrier tape or jacket, the separator 120 cannot shift laterally within the cable, ensuring consistent positioning of the conductive portion 124.

Figure 2A:
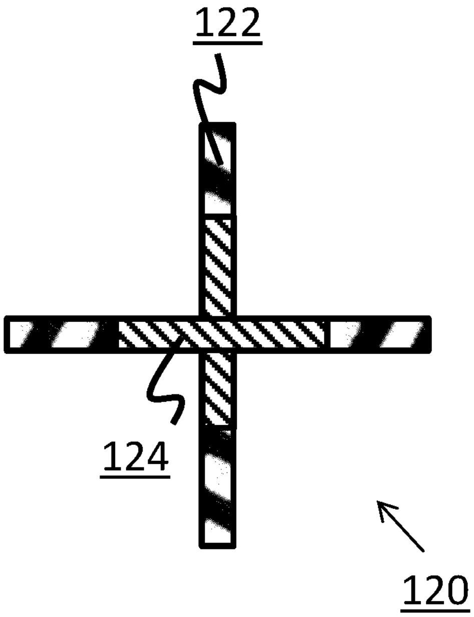
FIG. 2A is a cross section of an embodiment of the hybrid separator of FIG. 1B.
Figure 2B:
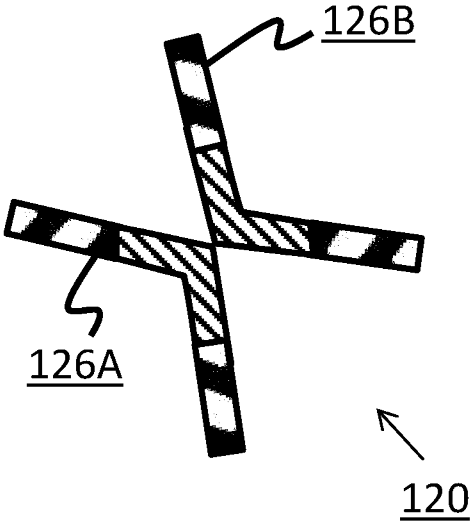
FIG. 2B is a cross section of another embodiment of a hybrid separator.

FIG. 2A is a cross section of an embodiment of the semi-conductive hybrid separator 120 of FIG. 1B, enlarged to show detail. As shown, a center portion of the separator may be conductive (e.g. material 124), while tip portions of the separator may be non-conductive (e.g. material 122). Although shown in a cross, in many implementations, the separator may be formed of two folded portions or segments. For example, FIG. 2B is a cross section of another embodiment of a semi-conductive hybrid separator 120 incorporating a first portion 126A and a second portion 126B (referred to variously as a separator half, a separator portion, portion 126, segment 126, or by similar terms). As shown, each segment 126A, 126B may be folded to approximately 90 degrees and placed with the outer creases adjacent to form a cross shape. In some implementations, the segments may overlap slightly at the center, and an adhesive layer may be applied between the overlap to form a single separator 120. Manufacturing the separator 120 in this manner may be highly cost effective, as a cross shape need not be extruded as in crossweb fillers.

Figure 2C:
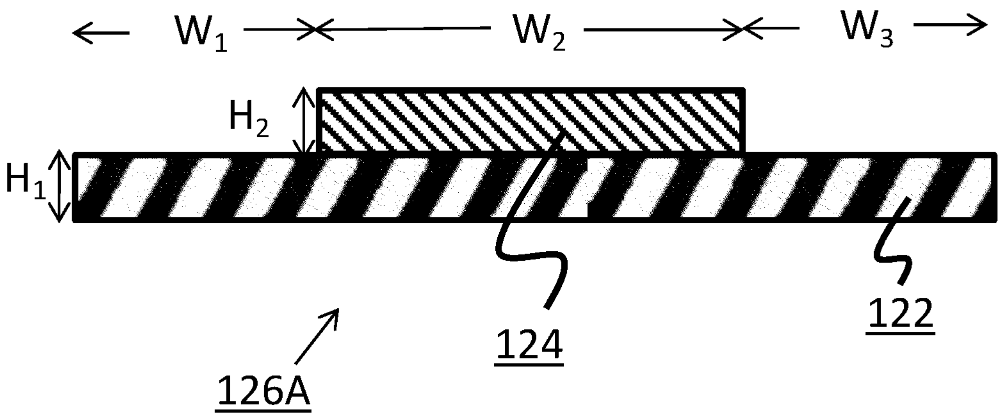
FIG. 2C is an enlarged cross section of a portion of an embodiment of a hybrid separator.

Although shown with non-conductive portions at the tips of separator segments 126, in many implementations, the non-conductive portions may extend across the entire length of the separator half as a continuous layer or substrate, with the conductive portion applied as a secondary layer. FIG. 2C is an enlarged cross section of a portion of one such embodiment of a separator half 126A. As shown, a non-conductive substrate 122 may extend across the entire separator half, with a conductive layer 124 affixed to the substrate (e.g. via an adhesive layer or thermal bond, not illustrated).

In many implementations, dimensional parameters of the hybrid separator may be adjusted to fine tune or optimize the balance of crosstalk protection versus impedance impact to the cable. For example, layer heights $H_1$ and $H_2$ may be adjusted, as well as the width $W_2$ of the conductive layer 124, and the layer's spacing or offset $W_1$, $W_3$ from each edge of the non-conductive layer 122.

Figure 2D:
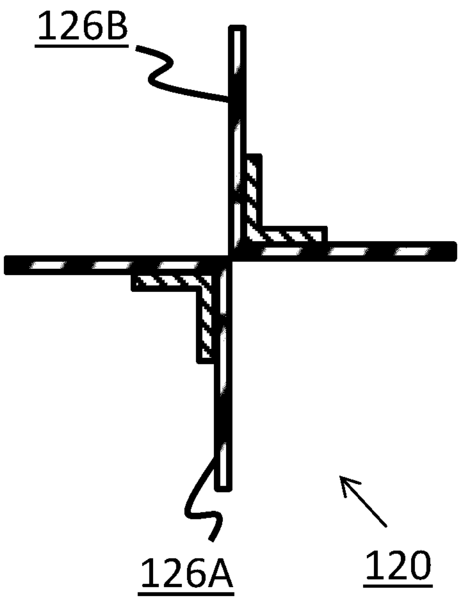
FIGS. 2D-2G are a cross sections of other embodiments of a hybrid separator.

FIGS. 2D-2G are a cross sections of other embodiments of a semi-conductive hybrid separator 120 with various dimensional parameters. As shown in FIG. 2D, conductive layers 124 of each separator segment 126A, 126B may be very narrow in some implementations, for example to provide just enough crosstalk protection to meet category 6A near-end crosstalk (NEXT) performance:

| Frequency (MHz) | NEXT loss (dB) |
|---|---|
| $1 \le f < 300$ | $-20\log\left(10^{\frac{-\left(44.3-15\log\left(\frac{f}{100}\right)\right)}{20}}+10^{\frac{-\left(54-20\log\left(\frac{f}{100}\right)\right)}{20}}\right)$ |
| $300 \le f \le 500$ | $34-33.13\log\left(\frac{f}{100}\right)$ |

In other implementations, greater or lesser amounts of conductive layers may be utilized, depending on the requirements of the relevant communication standard. For example, to optimize performance or meet requirements of relevant standards, the amount of filler material and its dimensions, the ratio of conductive to non-conductive material or the ratio of shielding material to substrate material, or other such parameters may be tuned or adjusted. Such tuning may be performed manually (e.g. iteratively adjusting parameters and measuring performance), or automatically or semi-automatically (e.g. via modeling and testing of adjusted parameters).

Figure 2E:
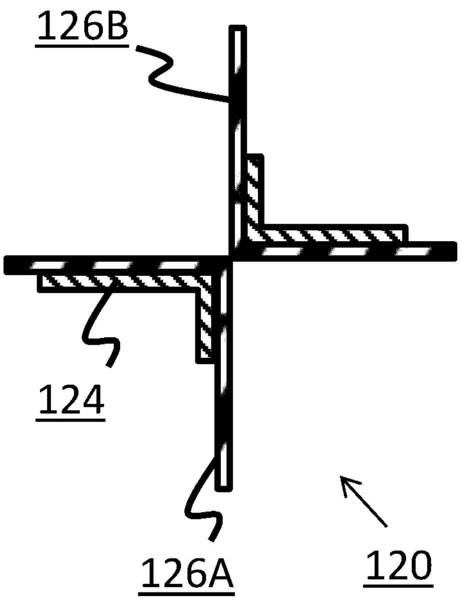
Figure 2F:
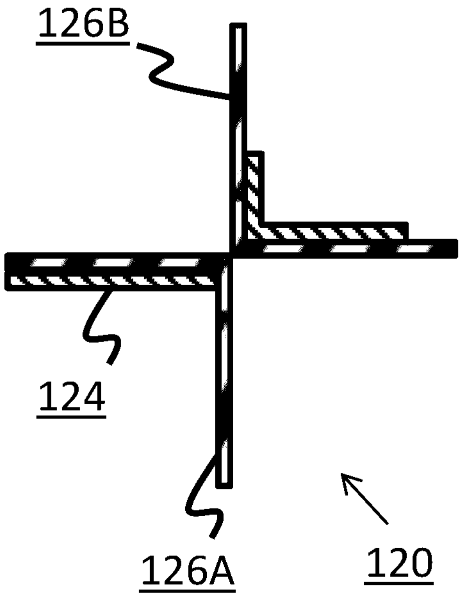

Conductive layers 124 need not be centered on each separator halves 126A and B. As shown in FIG. 2E, in some implementations, asymmetrical conductive layers 124 may be offset (e.g. increasing $W_1$ or $W_3$) to improve NEXT more on one axis than another (e.g. between upper left and lower left conductor pairs; and between upper right and lower right conductor pairs). This may be helpful in implementations in which some adjacent conductor pairs have very similar lay lengths and more susceptibility to crosstalk and require greater shielding, without utilizing additional conductive material between adjacent conductor pairs that have very different lay lengths and more immunity to crosstalk. In a further implementation shown in FIG. 2F, the separator segments may be completely asymmetrical, with one separator half 126A having a conductive layer 124 extending mostly or entirely along one half of the non-conductive layer, while the other separator half 126B has a more centered conductive layer. Accordingly, depending on the specific relationships between adjacent conductor pair combinations and their susceptibility to crosstalk, different dimensional parameters may be utilized for the separator segments and conductive and non-conductive layers.

Figure 2G:
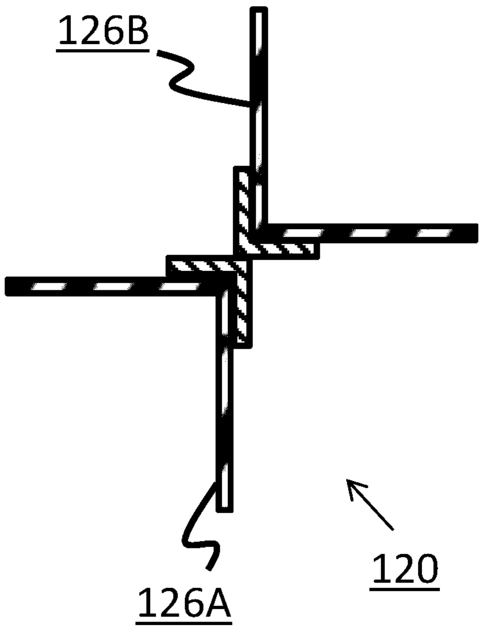

Although discussed above in implementations in which non-conductive layers 122 meet in the center of the separator 120, in other implementations, the separator halves may be folded in the opposite direction such that the conductive layers 124 meet in the center as shown in FIG. 2G. The conductive layers 124 may be joined in an overlapping region via an adhesive, thermal bond, or similar methods. This may allow for electrical conductivity between the conductive layers of the two separator segments 126A-126B, which may provide improvement of electrical performance in some implementations (e.g. improved electrostatic interference rejection, particularly if the conductive layers are grounded; or improved alien crosstalk rejection if not).

Figure 2H:
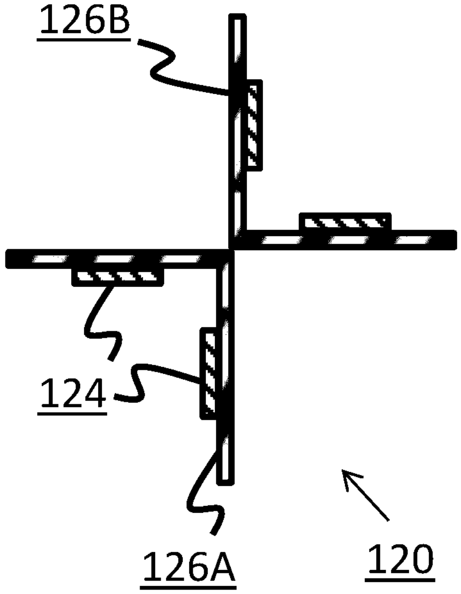
FIGS. 2H and 2I are cross sections of other embodiments of a hybrid separator utilizing multiple conductive portions.
Figure 2I:
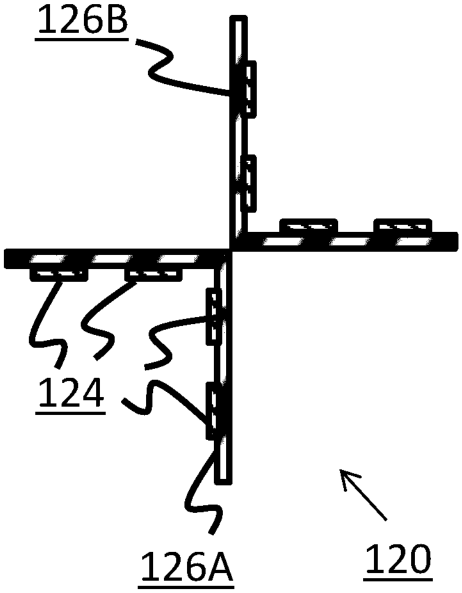

Conductive layers 124 need not be laterally continuous across each separator half; or similarly, each separator half may include multiple discontinuous conductive layers 124. For example, FIGS. 2H and 2I are cross sections of other embodiments of a semi-conductive hybrid separator 120 utilizing multiple conductive portions 124. In the implementation of FIG. 2H, each separator half 126 includes two conductive portions 124, centered on each leg of the separator cross, and corresponding to the center of each conductor pair. This may provide improved shielding between pairs. In a similar implementation, FIG. 2I includes four conductive portions 124 on each leg. Other numbers and/or spacings of conductive portions may be utilized in different implementations, including asymmetric configurations (e.g. two conductive portions on one leg, one wide conductive portion on the other).

Figure 2J:
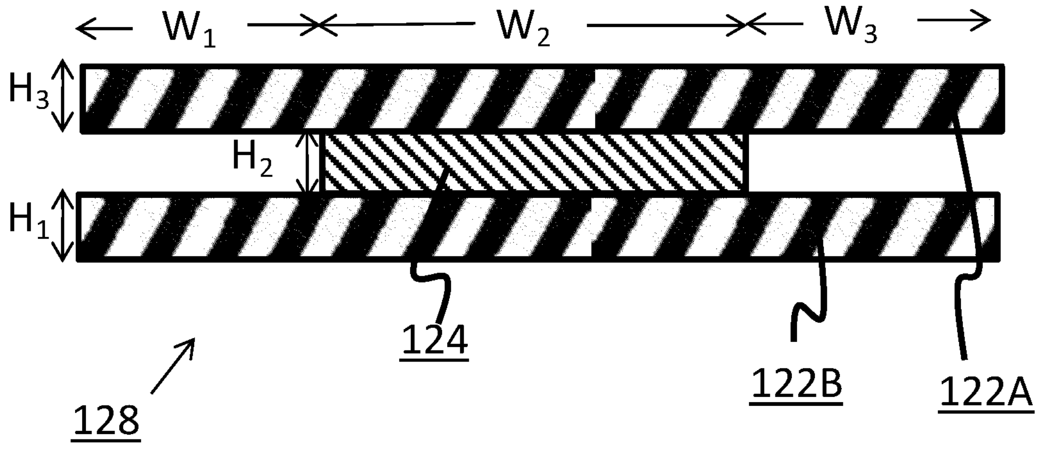
FIG. 2J is an enlarged cross section of a portion of an embodiment of a hybrid separator.
Figure 2K:
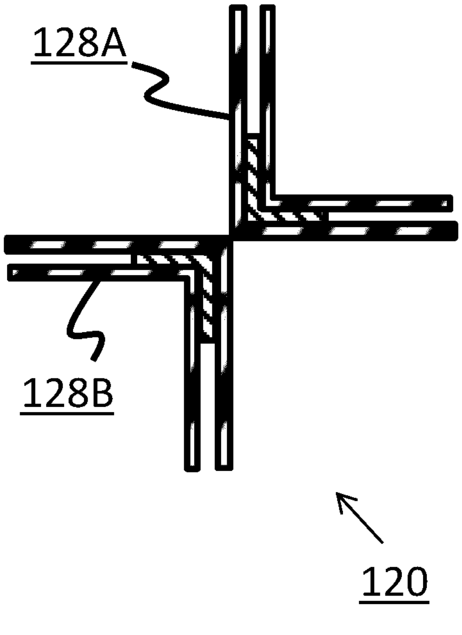
FIGS. 2K and 2L are cross sections of embodiments of the hybrid separator of FIG. 2J.
Figure 2L:
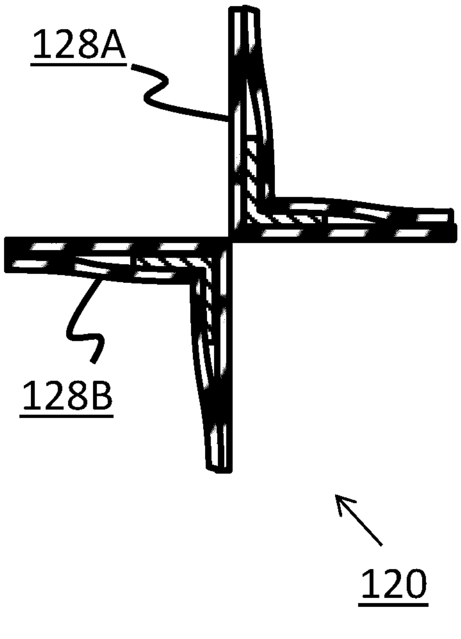

As discussed above, in many implementations, the separator may comprise two layers, such as a non-conductive substrate and a conductive layer. In other implementations, additional layers may be employed, such as a trilaminate foil. For example, FIG. 2J is an enlarged cross section of a portion of an embodiment of a semi-conductive hybrid separator 128 having a first non-conductive layer 122A, a conductive layer 124, and a second non-conductive layer 122B. The heights of each non-conductive layer 122A, 122B may be identical or different. FIG. 2K is a cross section of an embodiment of the semi-conductive hybrid separator of FIG. 2J. Variations of placement and width of the conductive layer may be employed as discussed above with FIGS. 2A-2I. Additionally, the non-conductive layers 122A, 122B need not remain separated at the tips; instead, as shown in the implementation of FIG. 2L, the non-conductive layers may be joined in regions beyond the conductive layers (either mechanically pressed together, e.g. by the conductor pairs; or joined with an adhesive or other bond).

Figure 2M:
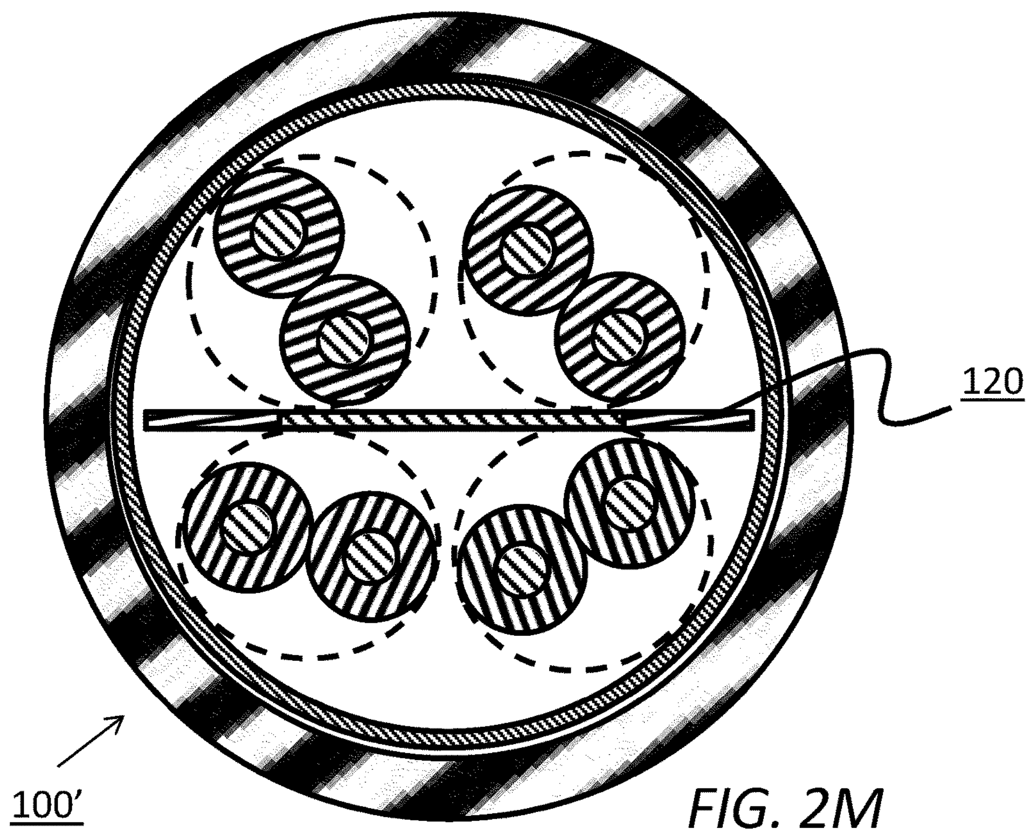
FIG. 2M is a cross section of another embodiment of a UTP cable incorporating a hybrid separator.

Although shown in FIGS. 2A-2I with a cross-shaped separator, in some implementations, the separator may be linear or a flat ribbon shape. This may reduce manufacturing costs and the amount of filler material needed in many implementations, while still providing adequate separation and attenuation between conductor pairs. For example, FIG. 2M is a cross section of an embodiment of a UTP cable 100' incorporating a linear or flat hybrid separator 120. The placement between conductor pairs of the hybrid separator may be selected to minimize crosstalk, e.g. by placing the separator between conductor pairs having the most similar twist or lay length (such that pairs on the same side of the separator have greater differences in their lay length than with pairs isolated by the separator).

Figure 2N:
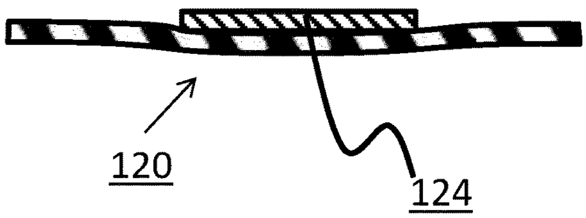
FIGS. 2N and 2O are cross sections of additional embodiments of a hybrid separator.
Figure 2O:
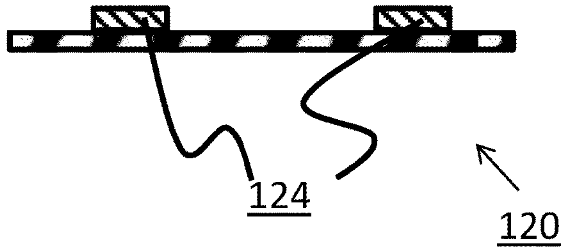

FIGS. 2N and 2O are cross sections of example embodiments of such linear or flat separators. In some implementations, as shown in FIG. 2N, the separator may have a single conductive portion 124. In other implementations, as shown in FIG. 2N, the separator may have multiple conductive portions 124 and/or may not have conductive material in the lateral center or middle of the separator (e.g. similar to the separators of FIGS. 2H and 2I discussed above). Although shown as a single substrate layer in the embodiments of FIGS. 2N and 2O, in other implementations, the separator may have multiple substrate layers (e.g. sandwiching or surrounding conductive material, as in the embodiments of FIGS. 2J-2L).

Figure 3A:
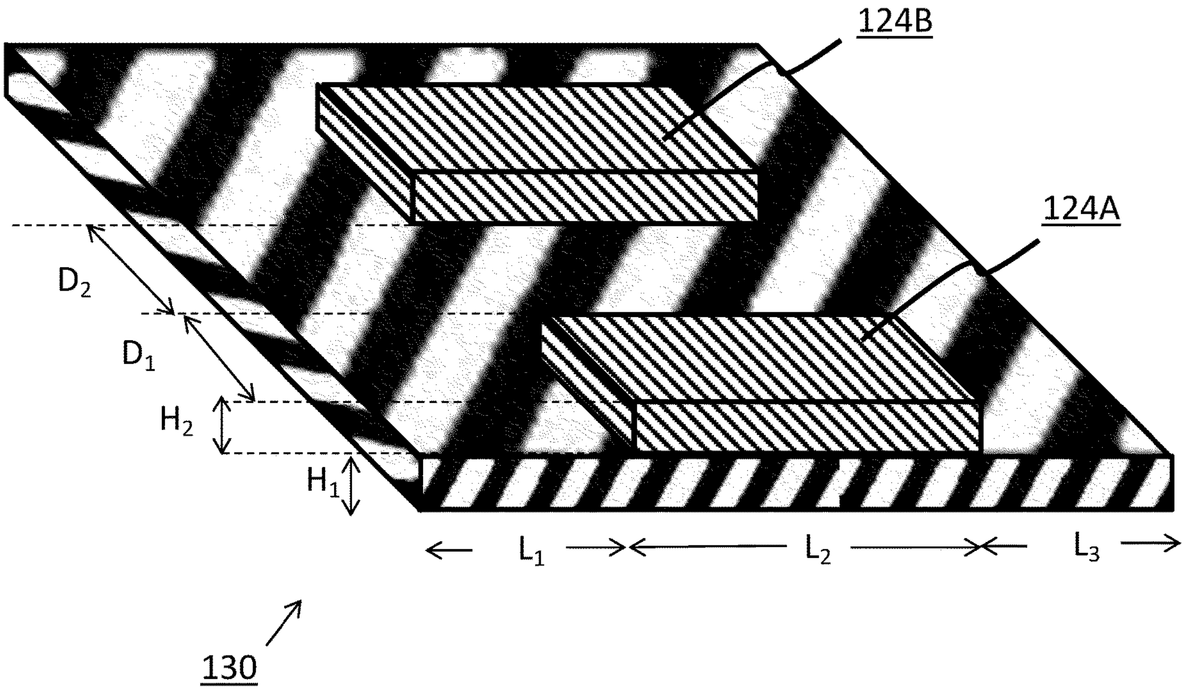
FIG. 3A is an isometric view of a portion of an embodiment of a hybrid separator.

Although primarily discussed above in terms of lateral cross section, in various implementations, the nonconductive and conductive layers may be continuous or discontinuous along a longitudinal length of the cable. For example, FIG. 3A is an isometric view of a portion of an embodiment of a semi-conductive hybrid separator portion 130 incorporating discontinuous conductive layers 124A, 124B. Each conductive layer may extend along a longitudinal dimension $D_1$ which may be identical for each layer or different, in various implementations. Layers may also be spaced by a second longitudinal dimension $D_2$, which may be identical to $D_1$ or different. For example, in some implementations, $D_2$ may be very small such that the conductive layers are almost continuous along the length of the cable; small breaks may be helpful for reducing electromagnetic interference along the cable.

Figure 3B:
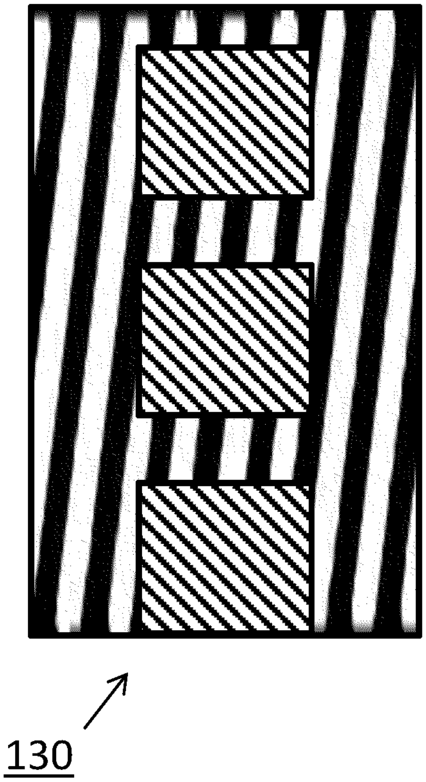
FIGS. 3B and 3C are top views of embodiments of the hybrid separator of FIG. 3A.
Figure 3C:
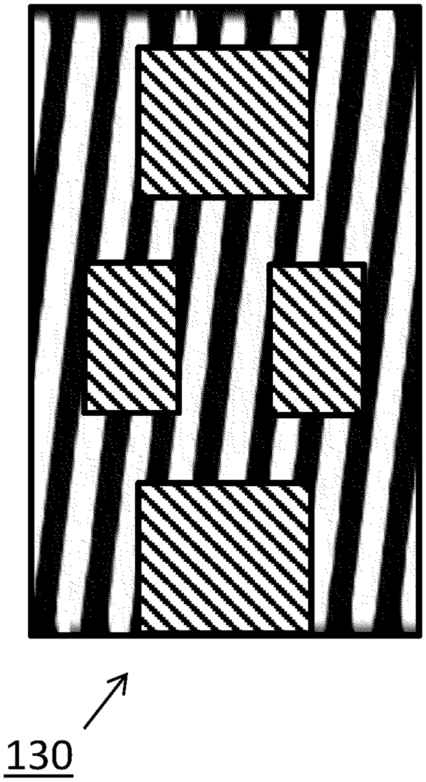

Additionally, the positioning of conductive layers 124 may be varied along the longitudinal length of the separator portion or cable. For example, in the top view of FIG. 3B, illustrated is an embodiment of the separator portion of FIG. 3A including a plurality of identical conductive layers. Conversely, in the top view of FIG. 3C, a first lateral region includes a single conductive layer; while a second lateral region includes two conductive layers. This may be particularly useful when matched to a twist of a conductor pair.

Figure 3D:
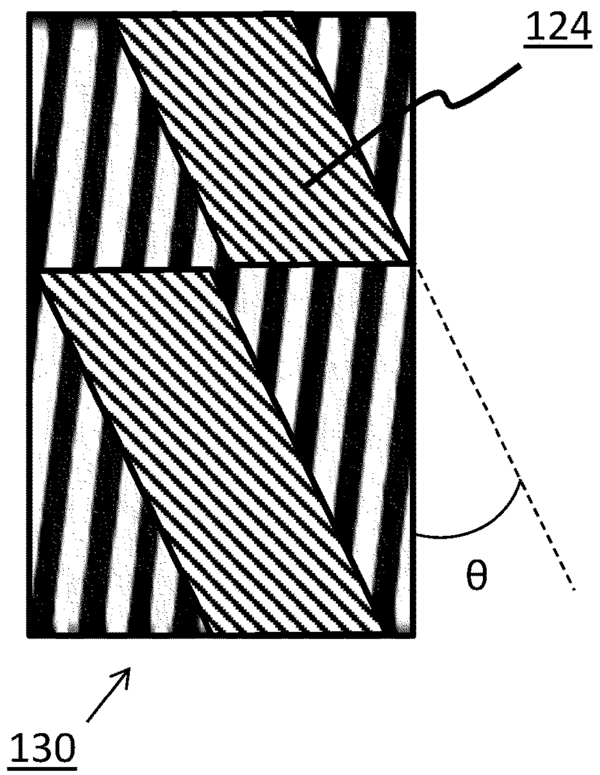
FIG. 3D is a top view of another embodiment of a hybrid separator.
Figure 3E:
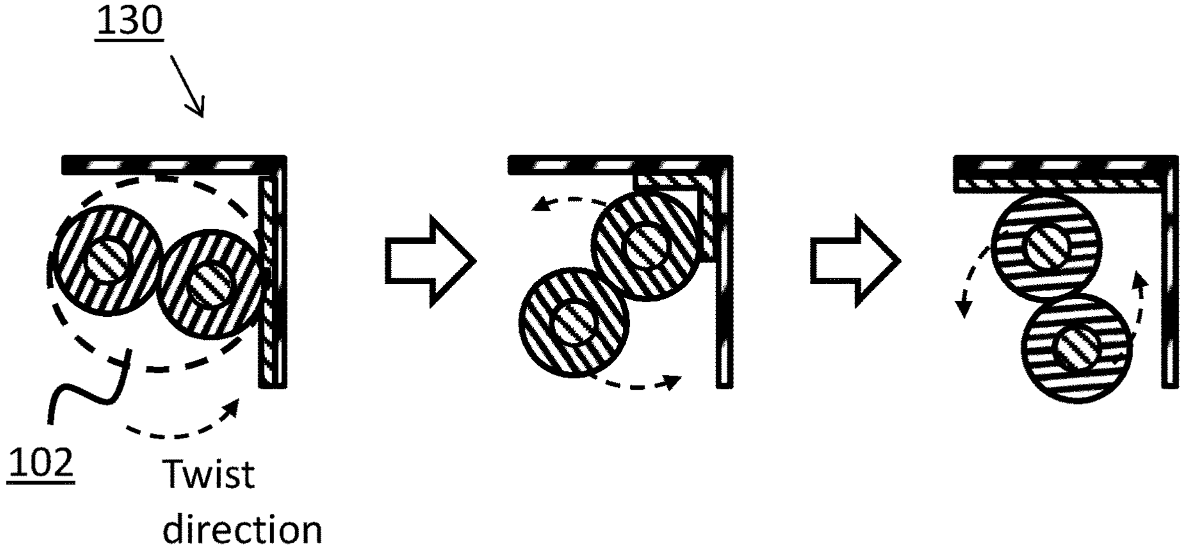
FIG. 3E is a set of cross sections of an embodiment of the hybrid separator of FIG. 3D at different longitudinal positions along a data cable.

In a similar implementation, the position of a conductive layer may be continuously varied along the length of the cable. FIG. 3D is a top view of such an implementation of a separator portion 130 with a conductive layer 124 applied at an angle θ relative to the longitudinal axis of the separator portion. The angle may be matched to a twist angle of a pair of conductors in some implementations, such that the conductive layer "follows" the twist of the conductor pair along the length of the cable. For example, FIG. 3E is a set of cross sections of an embodiment of the semi-conductive hybrid separator of FIG. 3D at different longitudinal positions along the cable next to a pair of conductors 102. As shown, the conductive layer may be adjacent to a conductor at a first position (shown at left) and, as the conductor pair is rotated along the length of the cable to a second position (shown at middle), the conductive layer may be positioned similarly adjacent to the conductor. As the twist continues such that the conductor is in a third position (shown at right), the conductive layer may again be similarly positioned adjacent to the conductor. Different angles of θ may be used on different separator portions to correspond to different twist angles or lay lengths of pairs (e.g. a first separator portion may have a conductive layer lay length corresponding to a lay length of one twisted pair of conductors, while a second separator portion has a conductive layer lay length corresponding to a lay length of a second twisted pair of conductors). This may maximize shielding efficiency for those conductor pairs, in some implementations.

Figure 4A:
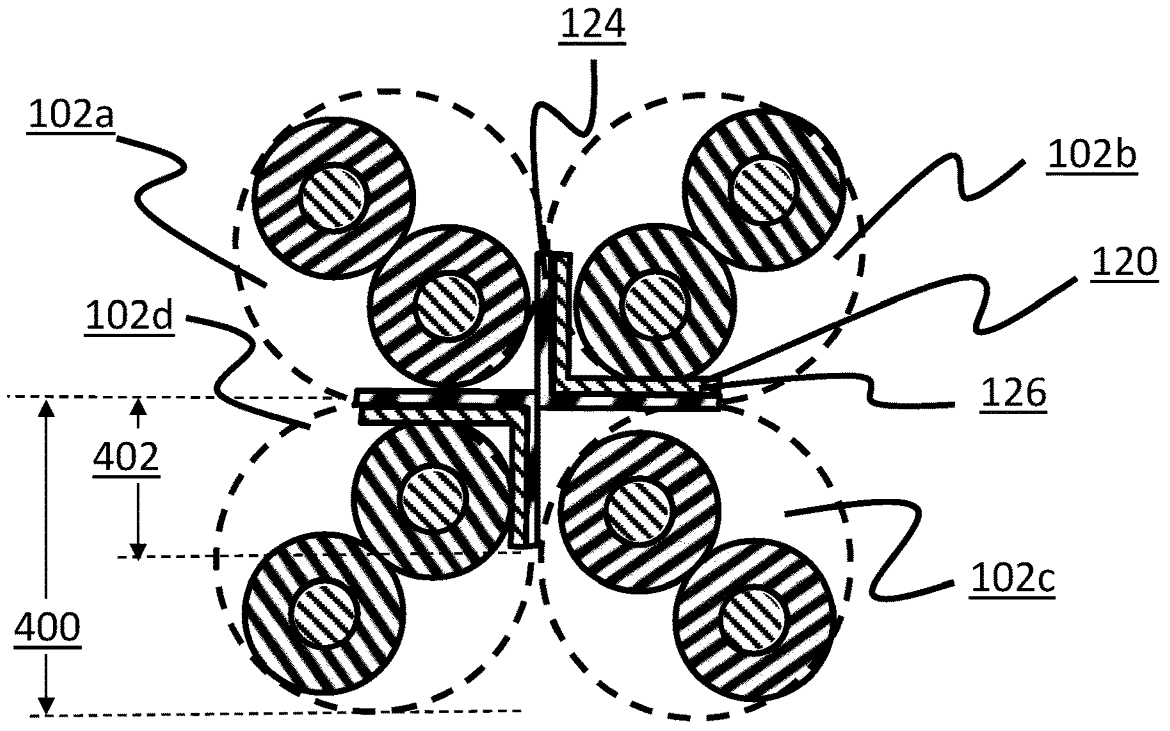
FIGS. 4A-4F are cross sections of additional embodiments of a hybrid separator.

Additionally, in many embodiments, the separator need not extend past the conductors, and may even extend less, e.g. to a position closer to the center of the cable than the conductor pairs. FIGS. 4A-4D are cross sections of some such additional embodiments of a hybrid separator. Referring first to FIG. 4A, as shown, conductor pairs 102*a*-102*d* may be positioned surrounding a separator 120, which may comprise a non-conductive portion 126 and conductive portion 124. As discussed above, separator 120 may be formed from two portions of bilaminate foils, folded and joined in the center to form a cross shape in some implementations. Although shown with non-conductive portion(s) 126 on the inside, separator 120 may be formed in reverse with conductive portion(s) 126 on the inside. Separator 120 may also be formed from a single piece of bilaminate foil, folded repeatedly into a cross shape. In some implementations, separator 120 may be formed of a trilaminate foil, or may comprise just a conductive foil.

Separators 120 such as that depicted in FIG. 4A may thus have a minimum amount of conductive materials necessary to achieve sufficient cross-talk attenuation between diagonal conductor pairs (e.g. between 102*a* and 102*c*, or 102*b* and 102*d*) while minimizing other effects on the cable (e.g. self-inductance, impedance, etc.). For example, as shown in FIG. 4A, in some implementations, each separator half or segment extends to a distance a 402 that is less than a total distance b 400 from the center of the cable to the outermost portion of a conductor pair. This ratio of a:b may be 1:2 in many implementations (or each segment may extend 50% of the way to the outermost edge), or may be smaller (e.g. with a shorter segment) such as 1:3, 1:4, or any other such value, or may be larger (e.g. with a longer segment) such as 2:3, 3:4, or any other such value. In many implementations, the segment may extend at least 50% of the way (e.g. with a ratio a:b greater than 1:2).

Figure 4B:
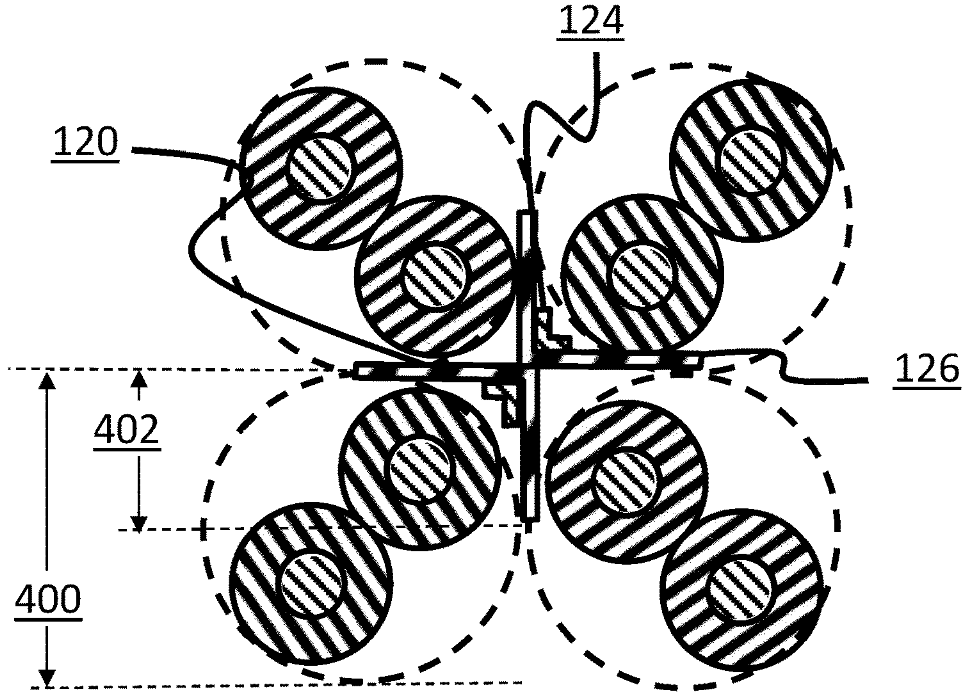

In a further implementation, FIG. 4B is a cross section of a hybrid separator with an extremely minimal amount of conductive material 124. While the conductive material may not provide shielding against cross-talk between laterally adjacent pairs (e.g. pairs 102*a* and 102*b*), it may still provide sufficient shielding against cross-talk between diagonal pairs to meet the requirements of the applicable communication standard (e.g. CAT 6A). As with other implementations discussed above, various positions and amounts of conductive material 124 and non-conductive material may be used with the implementations of FIGS. 4A and 4B, with hybrid separators that do not extend to or beyond conductor pairs 102. In many implementations, as shown, the non-conductive material of each segment may extend to approximately 50% of the outermost portion of the conductor pairs. In other implementations, the non-conductive material may extend to any other percentage of this length.

Figure 4C:
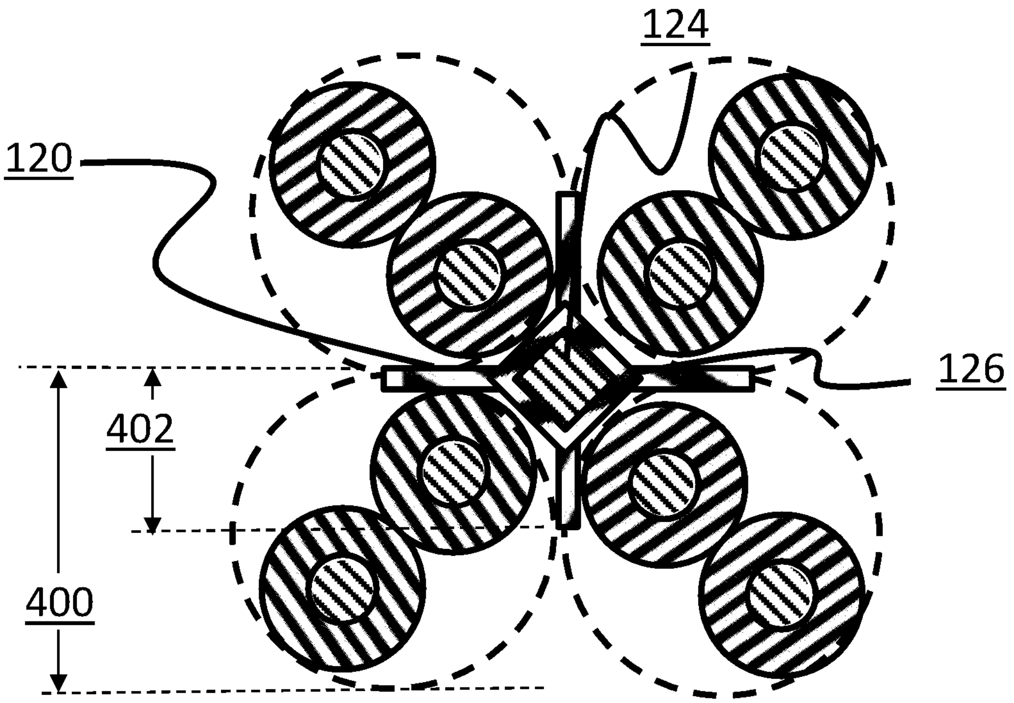
Figure 4D:
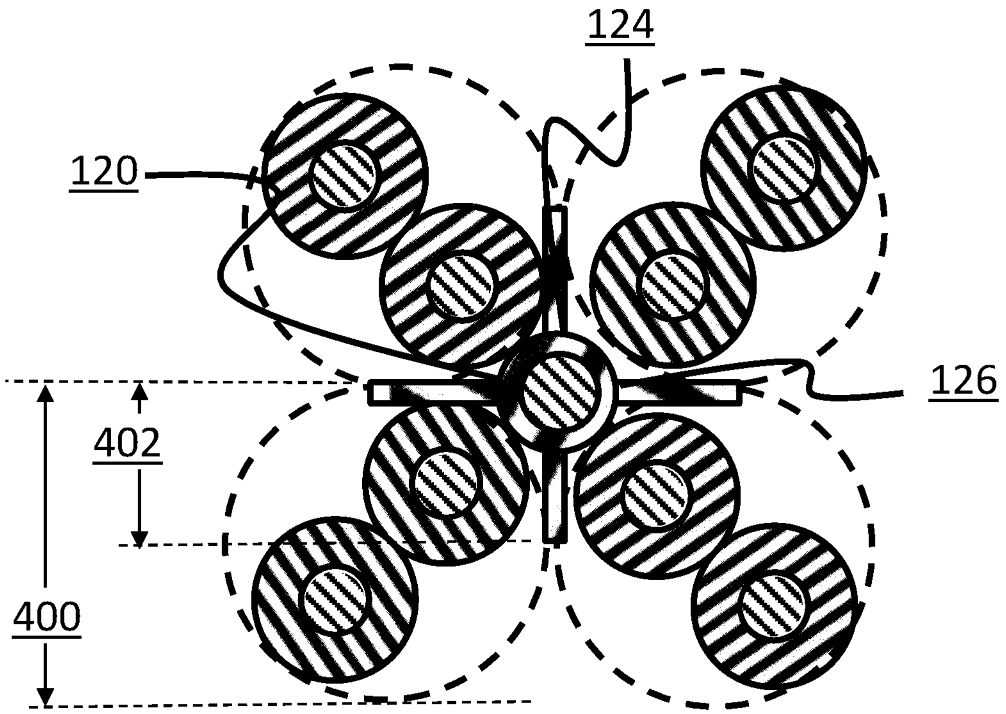
Figure 4E:
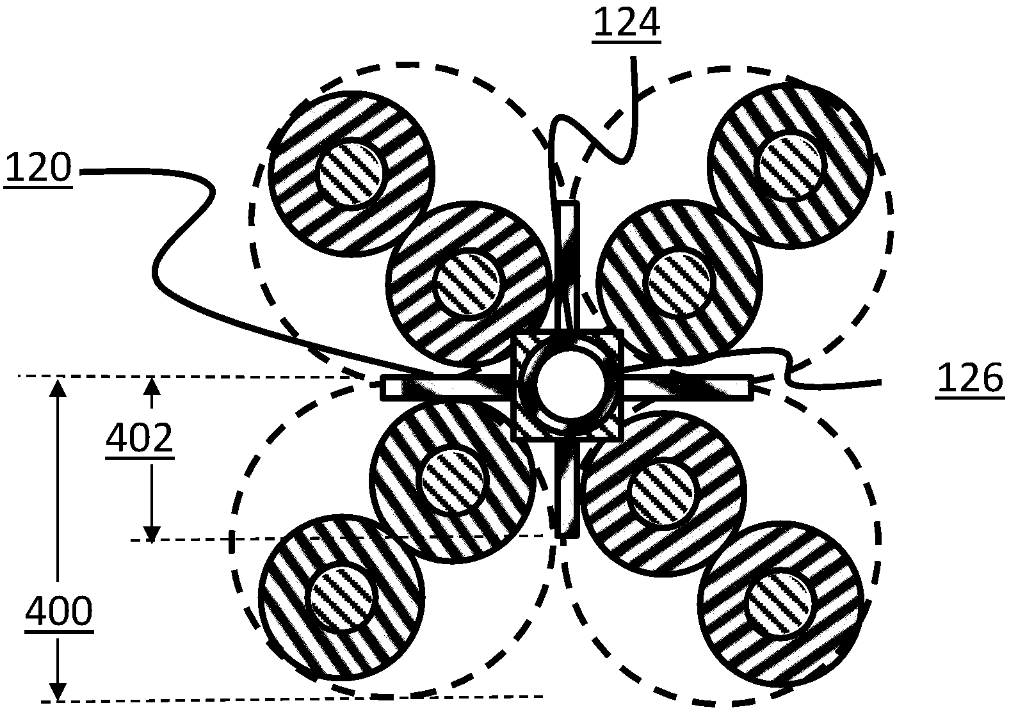

FIGS. 4C-4D are cross sections of additional implementations of a hybrid separator having a solid (or semi-solid) construction. Unlike the foils discussed above, in the implementations illustrated, the separator 120 may be formed of a central conductive portion 124 and surrounding non-conductive portion 126; or a central non-conductive portion 126 and surrounding conductive portion 124 in other implementations. Non-conductive portion 126 may be solid or foamed to reduce weight. In some implementations, non-conductive portion 126 may be partially foamed (e.g. an interior portion). In some implementations, separator 120 may have a square central cross section as in FIG. 4C, or a round central cross section as in FIG. 4D, or any other shape. FIG. 4E is a cross section of a similar implementation in which a central non-conductive portion 126 is hollow and has a circular cross section, and an outer conductive portion 124 configured as one or more ridges on the outside of the non-conductive portion extending longitudinally along the separator (such that separator 120 has the form of a ridged hollow tube). "Legs" made of conductive material, non-conductive material, or a combination of conductive and non-conductive material as discussed above may extend from the central portion of the separator as shown, and may extend a distance a 402. This distance a may be equal to, greater than, or less than a total distance b from the center of the cable to an outermost portion of a conductor pair 400. As discussed above, in many implementations, the ratio of a:b may be approximately 1:2, 1:3, 2:3, or any other such ratios.

Figure 4F:
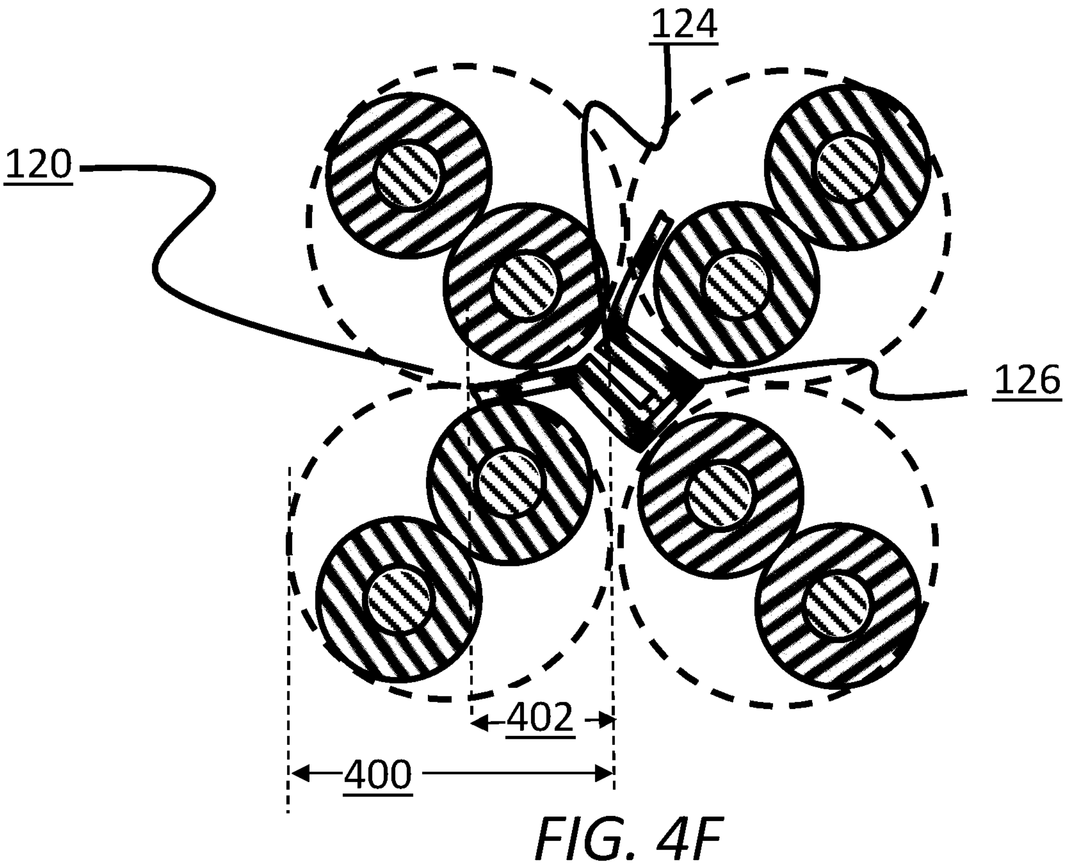

FIG. 4F is a cross section of another implementation of a hybrid separator formed from a foil with conductive and non-conductive portions 124, 126, and folded into a U-shape. In similar implementations, a foil may be rolled into a circle, folded into a triangle, or otherwise shaped. As discussed above, in various implementations, the non-conductive portions 126 may extend a distance 402 that is greater than, equal to, or less than a distance from the center of the cable to an outermost portion of a conductor pair 400. In some implementations, conductive portion 124 may be discontinuous along a longitudinal length of the cable (e.g. with breaks or separations at periodic or non-periodic intervals along the length of the cable to reduce electromagnetic interference). Additionally, in many implementations, the hybrid separator 120 may be twisted (e.g. to match a lay length of one of conductor pairs 102, or at a different lay length, in various implementations).

Accordingly, the systems and methods discussed herein provide for cables with a thin hybrid tape or separator having conductive and non-conductive portions or layers, with dimensional parameters that may be tuned to meet the requirements of a communication standard for crosstalk, return loss, and impedance, while substantially reducing the cable weight, stiffness, and cross-sectional diameter, and with reduced manufacturing costs and fewer materials. Although discussed primarily in terms of Cat 6A UTP cable, the hybrid tapes or separators may be used with other types of cable including any unshielded twisted pair, shielded twisted pair, or any other such types of cable.

Furthermore, although shown configured in a cross shape, in many implementations, a single separator portion may be utilized in an L-shape or straight line shape, and positioned such that one or more conductive layers are placed between conductor pairs requiring shielding. Similarly, in some implementations, a first separator may be positioned with a second separator in a T-shape (e.g. not including a leg between two adjacent pairs of conductors). This may allow for a smaller cable overall, and may be acceptable in some configurations (e.g. where said two adjacent pairs of conductors have very different lay lengths).

The above description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

What is claimed:

1. A cable, comprising:

a first twisted pair of conductors;

a second twisted pair of conductors; and a hybrid separator comprising:

a non-conductive portion; and a conductive portion attached to the non-conductive portion;

the conductive portion extending along the non-conductive portion and a position of the conductive portion relative to the non-conductive portion varying across a longitudinal length of the cable, the position of the conductive portion relative to the non-conductive portion corresponding to a twist angle of at least one of the first twisted pair of conductors or the second twisted pair of conductors.

2. The cable of claim 1, comprising:

the position of the conductive portion relative to the non-conductive portion configured to place at least a section of the conductive portion adjacent to at least one conductor of the first twisted pair of conductors or at least one conductor of the second twisted pair of conductors along the longitudinal length of the cable.

3. The cable of claim 1, comprising:

the position of the conductive portion relative to the non-conductive portion configured to provide a semi-continuous barrier between at least one conductor of the first twisted pair of conductors and at least one conductor of the second twisted pair of conductors.

4. The cable of claim 1, comprising:

the conductive portion having a lateral dimension larger than a lateral dimension of at least one conductor of the first twisted pair of conductors or at least one conductor of the second twisted pair of conductors; and the lateral dimension of the conductive portion configured to provide a similar shielding effect between the first twisted pair of conductors and the second twisted pair of conductors along the longitudinal length of the cable.

5. The cable of claim 1, comprising:

the non-conductive portion extending laterally to contact a barrier of the cable at a first side of the cable and at a second side of the cable; and the non-conductive portion configured to maintain placement of the conductive portion with the non-conductive portion in contact with the barrier of the cable at the first side of the cable and at the second side of the cable.

6. The cable of claim 1, comprising:

the conductive portion configured to provide one or more of reduced near end cross-talk (NEXT), minimized capacitive coupling, minimized inductive coupling, reduced return loss (RL), and reduced insertion loss between the first twisted pair of conductors and the second twisted pairs of conductors during operation of the cable.

7. The cable of claim 1, comprising:

the non-conductive portion positioned between the first twisted pair of conductors and the second twisted pairs of conductors.

8. The cable of claim 1, wherein:

the hybrid separator comprises:

a first segment including the non-conductive portion and the conductive portion; and a second segment comprising a second non-conductive portion and a second conductive portion, the second segment attached to the non-conductive portion, and the first segment and the second segment in contact with each other at a position near a middle of each of the first segment and the second segment.

9. A hybrid separator disposable within a cable, the hybrid separator comprising:

a non-conductive portion; and a conductive portion attached to the non-conductive portion;

the conductive portion extending along the non-conductive portion and a position of the conductive portion relative to the non-conductive portion varying across a longitudinal length of the hybrid separator, the position of the conductive portion relative to the non-conductive portion configured to correspond to a twist angle of at least one of a first twisted pair of conductors of the cable or a second twisted pair of conductors of the cable.

10. The hybrid separator of claim 9, comprising:

the position of the conductive portion relative to the non-conductive portion configured to place at least a section of the conductive portion adjacent to at least one conductor of the first twisted pair of conductors or at least one conductor of the second twisted pair of conductors along the longitudinal length of the cable.

11. The hybrid separator of claim 9, comprising:

the position of the conductive portion relative to the non-conductive portion configured to provide a semi-continuous barrier between at least one conductor of the first twisted pair of conductors and at least one conductor of the second twisted pair of conductors.

12. The hybrid separator of claim 9, comprising:

the conductive portion configured to have a lateral dimension larger than a lateral dimension of at least one conductor of the first twisted pair of conductors or at least one conductor of the second twisted pair of conductors; and the lateral dimension of the conductive portion configured to provide a similar shielding effect between the first twisted pair of conductors and the second twisted pair of conductors along the longitudinal length of the cable.

13. The hybrid separator of claim 9, comprising:

the non-conductive portion configured to extend laterally to contact a barrier of the cable at a first side of the cable and at a second side of the cable; and the non-conductive portion configured to maintain placement of the conductive portion with the non-conductive portion in contact with the barrier of the cable at the first side of the cable and at the second side of the cable.

14. The hybrid separator of claim 9, wherein the conductive portion is configured to provide one or more of reduced near end cross-talk (NEXT), minimized capacitive coupling, minimized inductive coupling, reduced return loss (RL), and reduced insertion loss between the first twisted pair of conductors and the second twisted pairs of conductors during operation of the cable.

15. The hybrid separator of claim 9, wherein the non-conductive portion is disposable between the first twisted pair of conductors and the second twisted pairs of conductors.

16. The hybrid separator of claim 9, comprising:

a first segment including the non-conductive portion and the conductive portion; and a second segment comprising a second non-conductive portion and a second conductive portion;

the second segment attached to the non-conductive portion, and the first segment and the second segment configured to contact each other at a position near a middle of each of the first segment and the second segment.

17. A method, comprising:

positioning a hybrid separator within a cable, the hybrid separator including a non-conductive portion and a conductive portion; and the conductive portion extending along the non-conductive portion and a position of the conductive portion relative to the non-conductive portion varying across a longitudinal length of the cable, the position of the conductive portion relative to the non-conductive portion configured to correspond to a twist angle of at least one of a first twisted pair of conductors of the cable or a second twisted pair of conductors of the cable.

18. The method of claim 17, wherein the position of the conductive portion relative to the non-conductive portion is configured to place at least a section of the conductive portion adjacent to at least one conductor of the first twisted pair of conductors or at least one conductor of the second twisted pair of conductors along the longitudinal length of the cable.

19. The method of claim 17, wherein the position of the conductive portion relative to the non-conductive portion is configured to provide a semi-continuous barrier between at least one conductor of the first twisted pair of conductors and at least one conductor of the second twisted pair of conductors.

20. The method of claim 17, wherein:

the conductive portion has a lateral dimension larger than a lateral dimension of at least one conductor of the first twisted pair of conductors or at least one conductor of the second twisted pair of conductors; and the lateral dimension of the conductive portion is configured to provide a similar shielding effect between the first twisted pair of conductors and the second twisted pair of conductors along the longitudinal length of the cable.

* * * * *